Patented July 4, 1939

2,164,932

UNITED STATES PATENT OFFICE 2,164,932

DIPHENYL-DIAMINO ACID COMPOUNDS

Eugene A. Markush, Jersey City, and Julius Miller, Newark, N. J., assignors to Pharma Chemical Corporation, New York, N. Y., a corporation of New York No Drawing. Application January 12, 1937, Serial No. 120,222

8 Claims. (Cl. 260—507)

Our invention relates to new diphenyl-diamino compounds, to dyes produced therefrom and to processes for producing the same and relates particularly to diamino-diphenyl having the following formula:

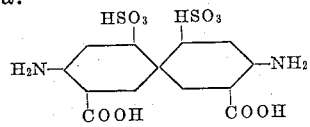

and its salts and dyes produced therefrom and processes for producing the same, the compounds being 3,3' dicarboxy-6,6' disulpho-4,4' diamino-diphenyl and its salts.

This new compound is capable of tetrazotization and combination symmetrically and asymmetrically with coupling components for the formation of valuable dyes, and is capable of condensation with diazoniums for the production of stabilized compounds which are also adapted for the production of valuable dyes especially suitable for use in the production of colored effects upon animal and cellulosic fibers.

One method for the formation of this new compound is designated as follows:

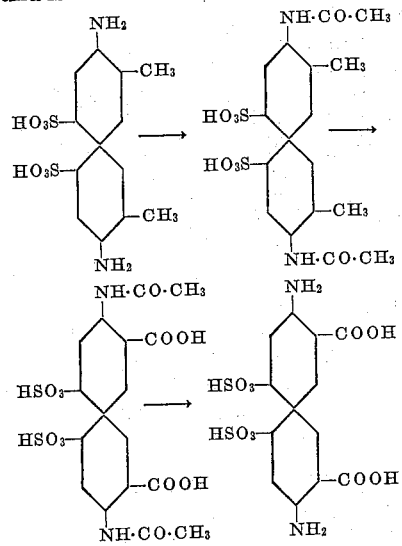

These compounds can be readily converted into their salts, such as the metal and alkali metal salts.

We give the following as an example of one process for the production of the compound of our invention:

232 grams of tolidine-disulphonic acid, 3,3' di-methyl-6,6' disulpho-4,4' diamino-diphenyl are formed into a paste with 312 c. c. of hot water and neutralized with sodium carbonate and, at a temperature of 70° C., 156 grams of acetic anhydride are added at once, the temperature rising to 90°–98° C. If a sample shows the consumption of nitrous acid, a further quantity of acetic anhydride is added. When the reaction is completed, the mass is neutralized with sodium carbonate and diluted with water to 20 liters. 384 grams of magnesium sulphate are then added to avoid the alkalinity produced by the subsequent oxidation with potassium permanganate. Sodium bicarbonate and other suitable compounds may be employed for this purpose.

The mass is then heated to 75°–80° C. and 543 grams potassium permanganate added, causing a rise in temperature, and the mass is stirred for 5 hours at 85° C. The reaction mixture is then maintained at room temperature for 12 to 18 hours, then heated to 100° C. and maintained at this temperature until a test for potassium permanganate is negative, indicating the full consumption of the potassium permanganate and the complete oxidation of the methyl groups of the tolidine-disulphonic acid employed.

The manganese peroxide thus formed is filtered off and well washed, and the filtrate and wash waters are combined and evaporated to 2500 c. c.

The thus obtained solution of dicarboxy-disulphodiacetyl-diamino-diphenyl is then saponified by adding 500 c. c. of 40° Bé. sodium hydroxide solution and heated for 2 hours at 90°–100° C.

The thus obtained 3,3' dicarboxy-6,6' disulpho-4,4' diamino-diphenyl can be obtained as the sodium salt by crystallization from this solution, or the free acid can be obtained by acidification of the solution and crystallization.

The yield is about 86% of the theory.

The thus produced compound can be tetrazotized and combined with substituted and unsubstituted amines, phenols, naphthols, naphthylamines, pyrazolones and other compounds capable of combining with tetrazotized compounds, forming valuable dyes, and we give the following as examples of the production of dyes:

Example 1

340 parts disulpho-dicarboxy-benzidine-tetra-sodium salt in 3000 parts water are neutralized with hydrochloric acid and 290 parts hydrochloric acid 20° Bé. are added. The solution is cooled by the addition of ice to 0–5° C., and a solution of 70 parts of sodium nitrite and 300 parts of water are added slowly. The resultant water-white solution of tetrazonium is then added with good stirring at a temperature of 8° C. to a solution of 200 parts phenyl-methyl-pyrazolon and 300 parts sodium carbonate in 2000 parts of water. The dye is formed immediately and precipitates out in bright reddish yellow crystals. The dye is filtered, pressed well and dried. It dyes wool in reddish yellow shades.

*Example 2*

340 parts disulpho-dicarboxy-benzidine-tetra-sodium salt are tetrazotized as above and added slowly at 8° C., to a solution of 341 parts of the mono-sodium salt of 1-amino-8-naphthol-3,6-disulphonic acid in 1000 parts of water and sufficient sodium carbonate to neutralize the free acid, and also 200 parts of sodium acetate crystals. When the coupling is completed, the bluish red solution is acidified with hydrochloric acid, heated to 65–70° C. and then saturated with salt. After standing for some time, the dye is filtered, pressed and dried. It dyes wool in bluish red shades.

Dyes prepared from tetrazotized disulpho-dicarboxy-benzidine having polyazo structure and suitable components will dye vegetable fibre, i. e., a dye of the general formula:

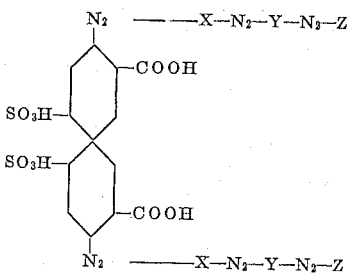

in which X is an aromatic compound capable of combining with diazonium and having a diazotizable amino group, Y is the same as X or having the same coupling power and an amino group capable of being diazotized, and Z is any coupling component.

*Example 3*

One mole of tetrazotized-dicarboxy-disulpho-benzidine is coupled in an alkaline solution with two moles of gamma acid, re-tetrazotized and coupled with meta-toluidine-omega-sodium-sulfonate, hydrolized, re-tetrazotized and coupled with two molecular equivalents of meta-phenyl-ene-diamine. This dye on cotton yields a brownish black shade.

Another type of dyes is indicated in the following:

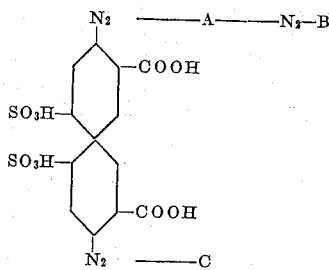

in which A is a coupling component capable of combining with diazonium in one position in alkali and in another position in acid medium such as amino naphthols, B is any negatively substituted aromatic amine capable of being diazotized and C is any coupling component.

*Example 4*

One mole of tetrazotized-dicarboxy-disulpho-benzidine is coupled with one mole of phenol in acetic acid and then in alkali with one mole of the dye formed by combining diazotized para-nitraniline in acid solution with gamma acid. This dye yields olive shades on cotton.

Among the other coupling components which can be employed are the beta-oxy-naphthoic acid arylides, the dichlor-sulpho-phenyl-methyl-pyrazolons, and their substitution products and by "coupling components" in our specification and claims we mean those compounds which are known to have the property of combining with diazotized and tetrazotized amines.

Other suitable oxidizing compounds may be employed as substitutes for the potassium permanganate mentioned, among which are peroxides and chromates, proper precautions being taken in order that the amino group will not be affected, and the metal and alkali-metal salts of our compounds can be readily produced.

Among the coupling components which may be used are the following: naphthols, phenols, diamines, pyrazolons, beta-ketonic coupling components such as aceto-acet-anilide, barbituric acid, amino naphthols, amino-naphthol-disulphonic acid H sodium salt, amino-naphthol-sulphonic acid J sodium salt, amino-naphthol-sulphonic acid S sodium salt, naphthol-4-sulphonic acid, beta-naphthol, alpha-naphthol, phenol, cresol, resorcinol, diacet-acet-tolidid, aceto-acet-anilide, and meta-phenylene-diamine.

We do not limit ourselves to the times, quantities, temperatures, chemicals or steps of procedure specifically mentioned as these are given simply as a means for clearly describing our invention.

What we claim is:

1. In a process for producing 3,3' dicarboxy-6,6' disulpho-4,4' diamino-diphenyl the steps which include converting 3,3'-dimethyl-6,6' di-sulpho-4,4' diamino-diphenyl into its diacetyl compound, oxidizing its methyl groups into carboxylic groups, and converting the diacetyl groups into amino groups.

2. In a process for producing 3,3' dicarboxy-6,6' disulpho-4,4' diamino-diphenyl the steps which include converting 3,3'-dimethyl-6,6' di-sulpho-4,4' diamino-diphenyl into its diacetyl compound, oxidizing its methyl groups into carboxylic groups by means of potassium permanganate and converting the diacetyl groups into amino groups.

3. In a process for producing 3,3' dicarboxy-6,6' disulpho-4,4' diamino-diphenyl the steps which include converting 3,3'-dimethyl-6,6' di-sulpho-4,4' diamino-diphenyl into its diacetyl compound by means of acetic anhydride, oxidizing its methyl groups into carboxylic groups, and converting the diacetyl groups into amino groups.

4. In a process for producing 3,3' dicarboxy-6,6' disulpho-4,4' diamino-diphenyl the steps which include converting 3,3'-dimethyl-6,6' di-sulpho-4,4' diamino-diphenyl into its diacetyl compound by means of acetic anhydride, oxidizing its methyl groups into carboxylic groups by means of potassium permanganate, and converting the diacetyl groups into amino groups.

5. In a process for producing 3,3' dicarboxy-6,6' disulpho-4,4' diamino-diphenyl the steps which include converting 3,3'-dimethyl-6,6' disulpho-4,4' diamino-diphenyl into its diacetyl compound by means of acetic anhydride, oxidizing its methyl groups into carboxylic groups by means of potassium permanganate and saponifying the diacetyl groups into amino groups.

6. 3,3' dicarboxy-6,6' disulpho-4,4' diamino-diphenyl.

7. Alkali metal salts of 3,3' dicarboxy-6,6' disulpho-4,4' diamino-diphenyl.

8. Compounds of the group consisting of 3,3'-dicarboxy-6,6' disulpho-4,4' diamino diphenyl and the alkali metal salts thereof.

EUGENE A. MARKUSH.
JULIUS MILLER.